Jan. 9, 1934.  V. W. HOLMES  1,943,118
VALVE GEAR FOR FLUID PRESSURE UNITS
Filed Nov. 7, 1930   5 Sheets-Sheet 1

Inventor:
Verena Winifred Holmes
By  *(signature)*
Attorney

Jan. 9, 1934.　　　V. W. HOLMES　　　1,943,118
VALVE GEAR FOR FLUID PRESSURE UNITS
Filed Nov. 7, 1930　　　5 Sheets-Sheet 3

Inventor:
Verena Winifred Holmes
By
Attorney

Jan. 9, 1934.  V. W. HOLMES  1,943,118
VALVE GEAR FOR FLUID PRESSURE UNITS
Filed Nov. 7, 1930    5 Sheets-Sheet 4
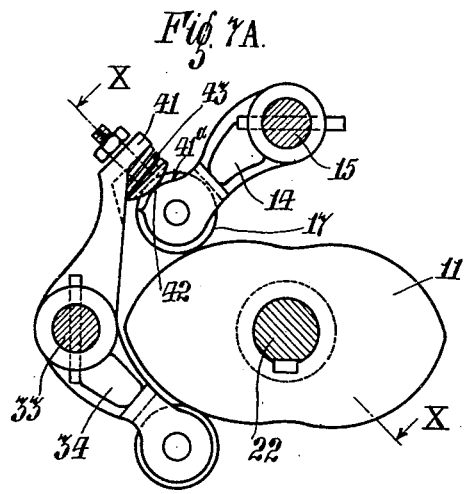
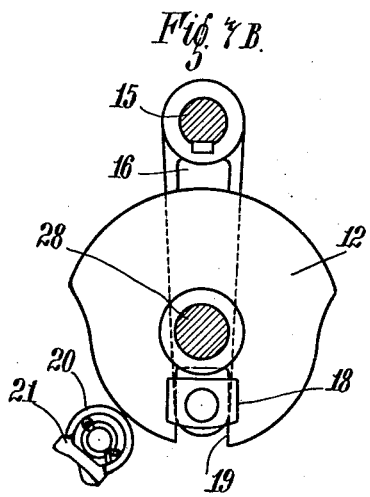
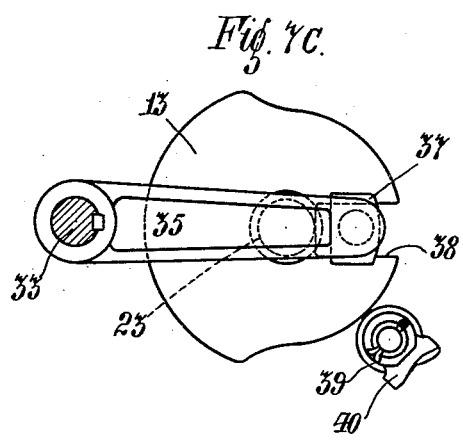
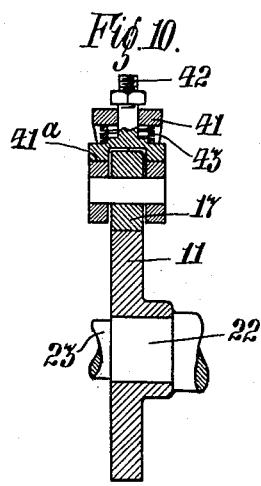

Jan. 9, 1934.   V. W. HOLMES   1,943,118
VALVE GEAR FOR FLUID PRESSURE UNITS
Filed Nov. 7, 1930   5 Sheets-Sheet 5
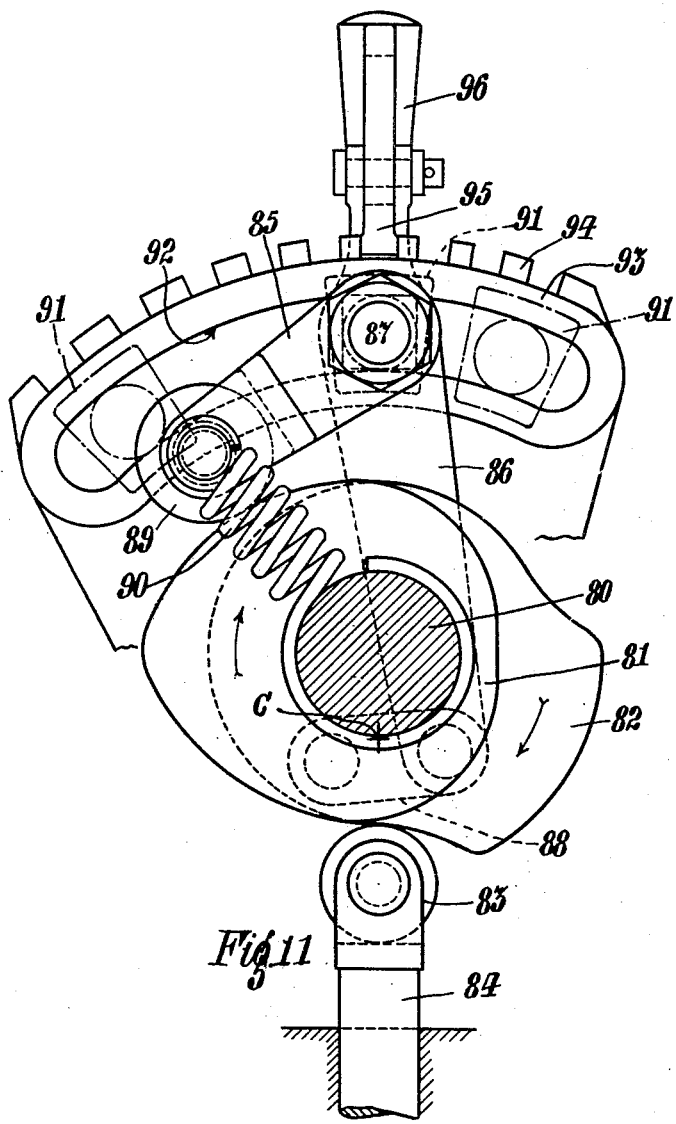
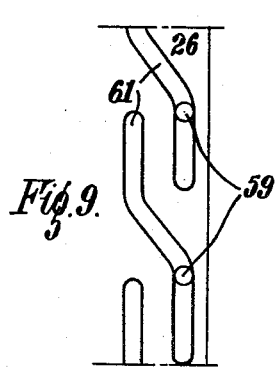

Patented Jan. 9, 1934

1,943,118

UNITED STATES PATENT OFFICE 1,943,118

VALVE GEAR FOR FLUID PRESSURE UNITS

Verena Winifred Holmes, Lenzie, near Glasgow, Scotland

Application November 7, 1930, Serial No. 494,018, and in Great Britain January 21, 1930

20 Claims. (Cl. 121—127)

My invention relates to valve gear for pressure fluid piston-operated units in which it may be desirable to vary the period of valve opening; and the object of the invention is to provide a ready means of varying the period of valve opening, while making the times of opening and closing occur at the desired points in the cycle.

The most usual requirement is for the valve to open at a fixed point in the cycle, and for the point of closing or cut-off to be variable, and this requirement can be readily fulfilled by valve gear according to the invention, although said gear can be adapted to provide for a variation of opening of the valve with a fixed point of closing, or for a variation of the points both of opening and of closing. The invention also provides for reversing the unit.

According to the invention, the improved valve gear comprises a rotary cam, lever means provided with a normally stationary but adjustable fulcrum and adapted to be oscillated with constant or substantially constant amplitude by said rotary cam, and an oscillatory valve-actuating cam adapted to be moved with constant or substantially constant amplitude oscillated by said lever means through a range of effective movement which can be varied, so as to vary the period of valve opening, by appropriately adjusting the fulcrum of said lever.

In a usual construction, the cams and the lever means are so devised that, by adjusting the fulcrum of the lever, the extent of the valve-actuating cam's range of effective movement is varied, whereas the beginning of said range is maintained constant. Accordingly, adjustment of the fulcrum would result in variation of the duration of valve opening, whilst the point of valve opening would be constant.

Figure 6:
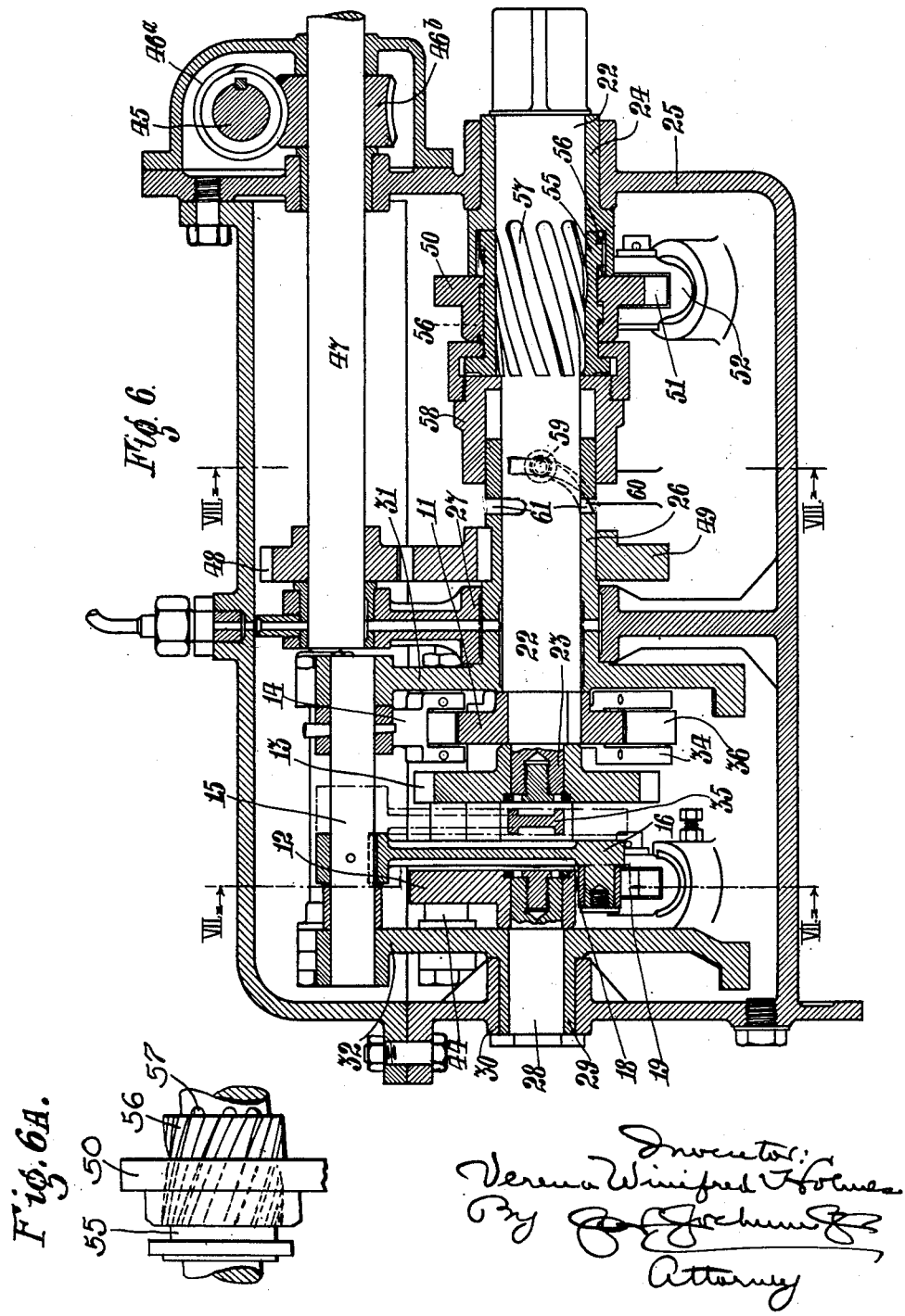
Figure 7:
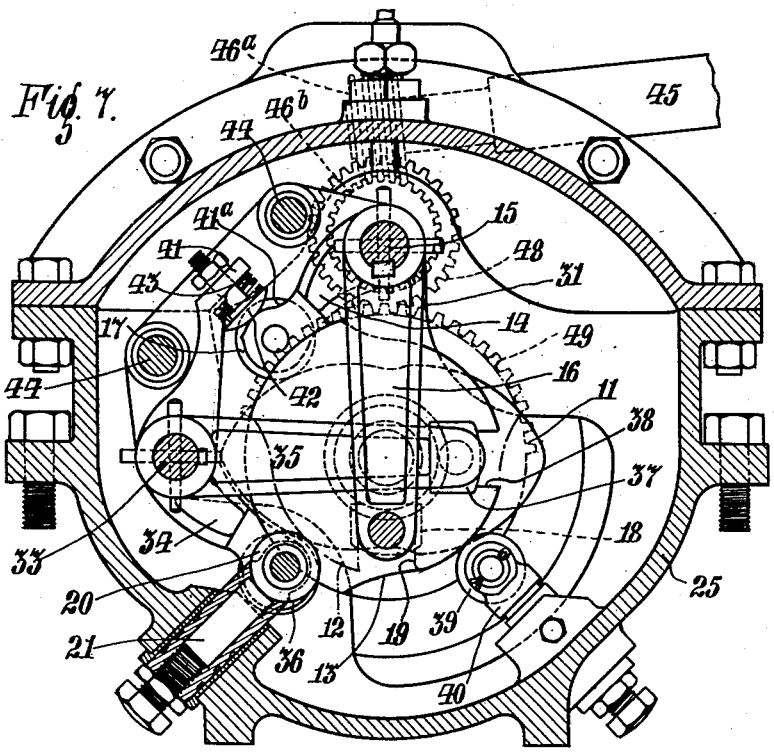
Figure 8:
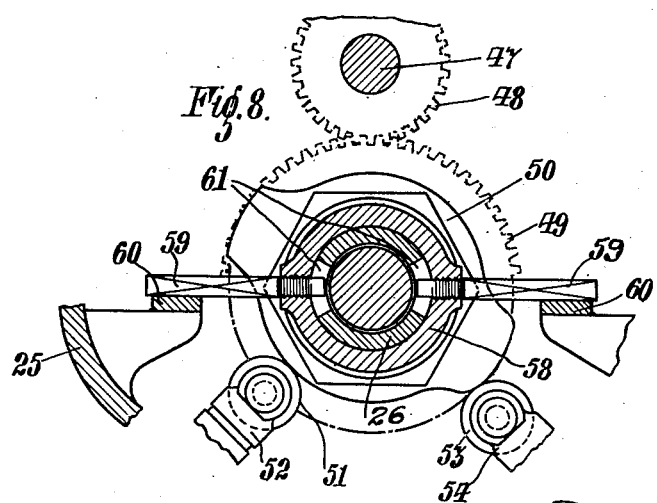

Figs. 6 to 10 illustrate a practical embodiment of valve gear according to the invention, Fig. 6 being an axial section of the valve gear, Fig. 6A a fragmentary elevation of parts included in Fig. 6, Fig. 7 a sectional elevation including an oscillatory cam shown in dot-and-dash lines, the section being approximately on the line VII—VII of Fig. 6, Figs. 7A, 7B and 7C respectively views of cams and the parts directly operated thereby in the positions already shown in Fig. 7, Fig. 8 a fragmentary sectional view including gearing shown in dot-and-dash lines, the section being approximately on the line VIII—VIII of Fig. 6, Fig. 9 a detail view, and Fig. 10 a section on the line X—X of Fig. 7A.

Fig. 11 is an elevation of a further practical embodiment of valve gear according to the invention.

Figure 1:
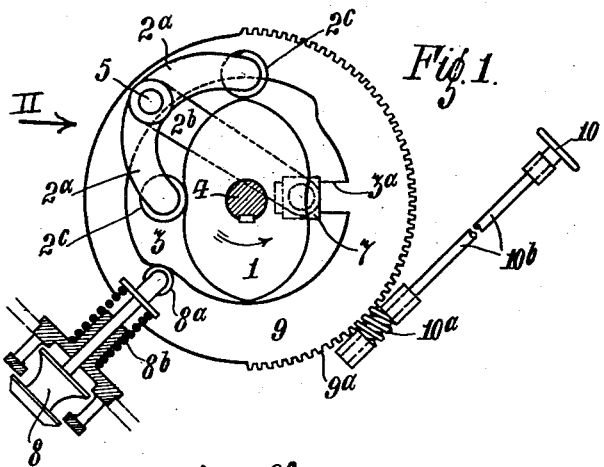
Figs. 1 and 2 are diagrammatic views at right angles to one another illustrating in a conventional manner one embodiment of the invention, these views being given mainly as a suitable means of explaining the principle upon which the invention is based.
Figure 2:
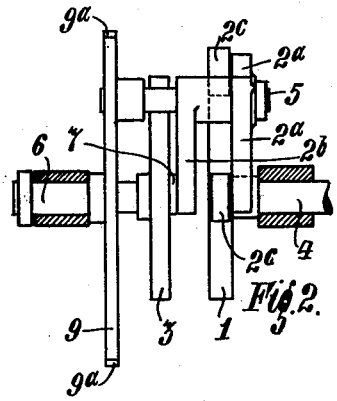

With reference to Figs. 1 and 2, which illustrate the actuation of a valve controlling the admission of pressure fluid, the rotary cam is denoted by 1, the lever means by $2^a$ and $2^b$ and the valve-actuating cam by 3.

The cam 1 is secured to a cam-shaft 4 which rotates at half the speed of the usual crankshaft (not shown) of the pressure fluid unit in which the valve gear is incorporated (i. e. the shaft 4 is a half-time shaft which rotates once for each two cycles of operations of the unit), while the cam 3 is carried by a stub-shaft 6 co-axial with the shaft 4. The cam 1 is formed with double approximately "constant velocity" surfaces. The lever means comprises three rigidly interconnected lever arms $2^a$, $2^a$ and $2^b$ which all branch from a boss journalled on a fulcrum 5 consisting of a shaft secured to a disc 9 which is angularly adjustable around the shaft 6. The arms $2^a$ both have rollers $2^c$ which act as followers to the surface of the cam 1. The arm $2^b$ has a die, or slide-block, 7 which engages in a radial slot, or guide-way, $3^a$ in the valve-actuating cam 3. The cam 3 has an arcuate surface $l$ of large radius and an arcuate surface $s$ of small radius, the difference between these radii being a little greater than the lift of the valve, which is denoted by the valve stem terminating in a roller $8^a$ which is forced towards the surface $s$ or $l$ by the action of a spring 8. The surfaces $s$ and $l$, which each extend around about half the periphery of the cam 3, merge into one another by way of suitable slopes and curves to give opening and closing of the valve 9.

The fulcrum 5 is displaceable at will into any selected position around the axis of the shaft 4, any required displacement being obtained by appropriately adjusting the disc 9, for which purpose the disc periphery is partly formed with teeth $9^a$ meshing with a worm $10^a$, which can be turned at will by means of a handwheel 10 on the worm-shaft $10^b$. It will be obvious that turning of the handwheel 10 results in angular adjustment of the fulcrum-shaft 5 about the axis of movement of the cams 1 and 3.

The arrangement is such that during one cycle of operations of the unit (i. e. one revolution of the unit's crank-shaft), the cam 1 moves through 180°, and that during this movement the lever $2^a$, $2^a$, $2^b$ and also the cam 3 are each given a complete oscillation, with the result that the valve 8 may be opened and closed, according to the setting of the fulcrum 5.

Figure 1A:
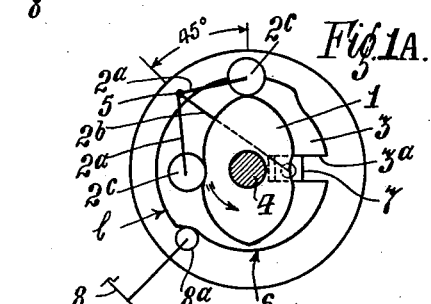
Fig. 1A is a diagram illustrative in a still more simplified manner of the construction illustrated in Figs. 1 and 2, the parts being in precisely the same position as in Fig. 1.
Figure 1B:
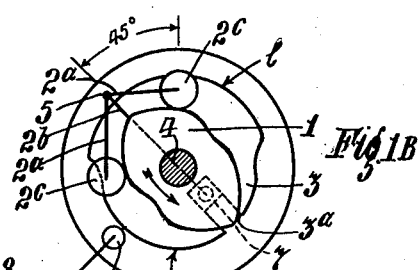
Fig. 1B is a diagram corresponding to Fig. 1A but showing a different position in the cycle of operations.

Referring now not only to Figs. 1 and 2 but also to the diagrams comprising Figs. 1A and 1B, the fulcrum 5 as therein shown is set to give the minimum cut-off, requiring a minute opening of the valve, and also to give ahead running of the unit (i. e. both the crank-shaft and the cam-shaft 4 rotate counter-clockwise as viewed in Figs. 1, 1A and 1B). The actual setting of the fulcrum 5 is about 45° counterclockwise from its central or zero position vertically above the axis of movement of the cams 1 and 3.

By referring to Figs. 1 and 1A, which represent the positions of the cams 1 and 3 at the beginning of the piston-stroke, it will be seen that the valve 8 is just open, and it will be obvious that the valve will quickly close as the cam-shaft 4, rotates out of the Fig. 1A position, since the surface s will be almost immediately moved into spaced relationship with the roller 10 on account of the movement imparted to the cam 3 by the lever means $2^a$, $2^a$, $2^b$. Fig. 1B shows the position of the parts when the cam-shaft 4 has rotated through 45° (i. e. the mid-position in the piston-stroke), the valve 8 being fully closed and having obviously been so for most of the rotation through 45°.

Figure 3:
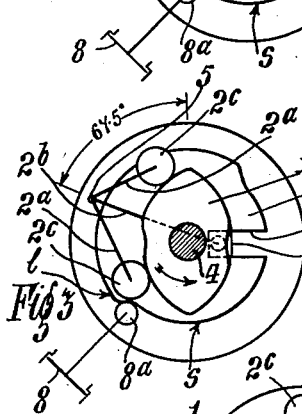
Figs. 3, 3A and 3B are diagrams showing a different setting of the adjustable fulcrum and respectively showing different positions in the cycle of operations.
Figure 3A:
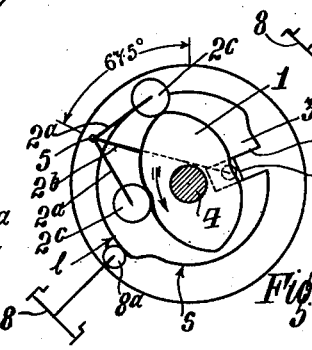
Figure 3B:
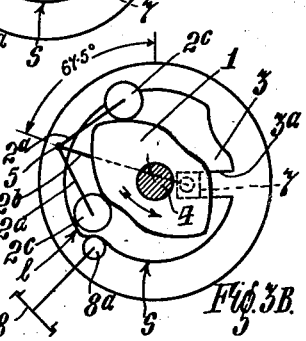

In order to increase the period during which the valve 9 remains opened, the fulcrum 5 must be displaced further in the direction in which the shaft 4 rotates (i. e. counter-clockwise). As shown in Figs. 3, 3A and 3B, the fulcrum 5 is displaced to a position 67.5° counter-clockwise from its central position. The result of this displacement is to maintain the opening of the valve 8 the same as with the setting shown in Figs. 1, 1A and 1B and to delay the closing of the valve 8 until mid-stroke, thus giving a cut-off of 50%. Fig. 3 shows the positions of the cams 1 and 3 at the beginning of the stroke, when the valve 8 is just opening; Fig. 3A shows the cam positions slightly later in the cycle of operations, the valve being fully open; Fig. 3B shows the cam positions at mid-stroke, when the valve is just closed.

The above-described result of further counter-clockwise displacement of the fulcrum 5 involves the following twofold effects:—

(1) The action of the cam 1 on the lever is delayed, since the peak of the cam and other points on its periphery do not reach the rollers $2^c$ of the oscillating lever in their new positions until later. The oscillation of the lever, therefore, and consequently of the oscillating cam, takes place later in each cycle.

(2) The lever is turned through an angle relative to its original position and thereby turns the oscillating cam through the same angle, relative to the cam-shaft centre. If the lever is regarded as being in the middle of its swing, with the axis of the long arm passing through the cam-shaft axis, it will be clear that if the fulcrum is moved further round, the lever at mid-swing will have taken up a position at an angle to its original position, corresponding to the angular movement of the fulcrum relative to the cam-shaft centre. Consequently the angular position of the oscillating cam will be similarly altered.

The effect (2) in its turn involves two effects, namely:—

(a) A greater part of the cam surface $l$ can move into engagement with the roller $8^a$, i. e. the extent of the effective movement of the cam 3 is increased.

(b) The angular displacement of the oscillating cam brings the opening point on its surface nearer to the roller $8^a$ by an angle equal to the fulcrum angular displacement. This causes the valve to open sooner in each oscillation.

It should be noted that the amplitude of the oscillation of the lever and cam 3 are unaffected by the setting of the fulcrum; it is only the effective range of movement which is altered.

The effects (1) and (b) are made to neutralize or counterbalance one another.

In the example under consideration, the proportions of the rotary cam 1 and lever are such that the oscillating cam 3 swings continuously through approximately 90° and back, and the rotary cam 3 also passes through 180° for every crank-shaft rotation; that is, there is one degree of cam movement for every two degrees of crank-shaft movement. When, therefore the fulcrum is displaced by 22½° counter-clockwise (say from the Fig. 1A position to the Fig. 3 position) the effect (1) will be to delay the action of the rotary cam 1 on the lever by 45° of crank-shaft rotation, and therefore to delay the oscillation of the lever and cam 3 by that amount. The effects (2) and (b) will be to turn the lever and cam 3 through 22½°, so that the opening point on the cam is nearer by that amount to the valve roller $8^a$. This point on the cam will therefore reach the roller 45° of crank-shaft rotation earlier in each oscillation, but since the oscillation takes place 45° crank-shaft degrees later in the cycle, the point of opening will remain constant.

Regarding the gear in general, it will be clear that the lever $2^a$, $2^a$, $2^b$, although adjustable in order to vary the valve timing, is normally stationary, and that both the lever and the cam 3 are respectively oscillated with constant amplitude no matter what setting the fulcrum may have.

Figure 4:
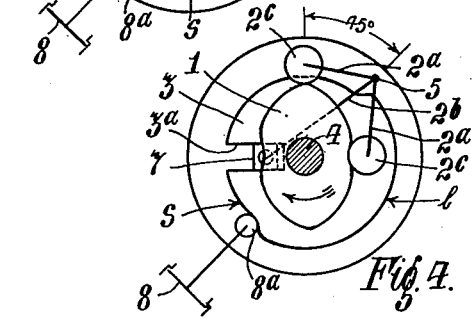
Figs. 4 and 5 are diagrams respectively showing different settings of the adjustable fulcrum to give reverse running of the unit (not shown) to which the valve gear is applied.
Figure 5:
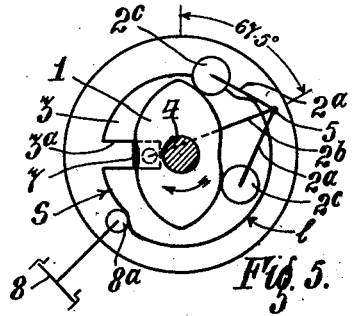

Reversing is effected by displacing the fulcrum 5 clockwise through 45° or more from its central or neutral position; e. g. in the same position as in Figs. 1A and 1B or Figs. 3, 3A and 3B, but to the opposite hand. Fulcrum-settings which will give reversal are shown in Figs. 4 and 5, the setting in Fig. 4 being about 45° so as to give a minimum cut-off, while the setting in Fig. 5 is about 67.5° so as to give a cut-off of about 50%. Both of these figures show the cam positions at the commencement of the piston-stroke, and it will be seen that the valve 8 is just opening.

It will be clear that any setting of the fulcrum 5 between 45° to both sides of the central position (i. e. between the settings shown in Figs. 1A and 4) will produce no opening whatever of the valve 8. That is to say, there is a range of 90° within which the gear is neutral.

The diagrammatic arrangement above described with reference to Figs. 1 to 5 obviates the use of a spring for keeping the lever in contact with the rotary cam, it having been found that, with a double-faced cam of the constant velocity type, both rollers 6 can be nearly in contact with the cam throughout the cycle if they are at 90° to one another relative to the cam axis. Even if they are not it is unimportant, so long as both are in contact when one is at the peak and the other at the lowest part of the profile, for then one arm 2ª will take charge of the swing of the lever in one direction, and the other arm 2ª will take charge of the return swing.

Referring to Figs. 6 to 9, the valve gear therein shown is designed to actuate the valves of a locomotive double-acting steam engine, said valves comprising two inlet valves and two exhaust valves.

The inlet valves are operated through the agency of three cams, namely, a rotary cam 11 and two oscillatory cams 12 and 13. Lever means interconnecting the cams 11 and 12 (whose outlines are shown best in Figs. 7A and 7B) comprise an arm 14 keyed to a fulcrum-shaft 15 to which is keyed a second arm 16. The arm 14 is provided with a roller 17 which acts as a follower to the cam 11. The arm 16 terminates in a die 18 which is slidably mounted in a radial slot 19 in the cam 12, the parts 18 and 19 thus constituting a pin-and-slot connection between the arm 16 and cam 12. The follower of the cam 12 is constituted by a roller 20 mounted on a valve-tappet 21.

The cam 11 is keyed to a cam shaft 22, which is rotated at half the engine speed, while the cam 13 is rotatably mounted on an extension 23 of said shaft. At one end, the shaft 22 is mounted in a bearing sleeve 24 which, in turn, is mounted in a shell 25 constituting the gear-case. Near its other end, the shaft 22 is supported by a sleeve 26 which is, in turn, supported in a bearing 27 forming a part of the gear-case 25. The cam 12 is rotatably mounted on a stub-shaft 28 arranged co-axially of the shaft 22 and supported in a sleeve 29, which, in turn, is supported in a bearing 30 forming a part of the gear-case 25.

The shaft 15 is rotatably mounted between two counter-balanced arms 31 and 32, the arm 31 being formed integral with the sleeve 26 and the arm 32 integral with the sleeve 29. The arms 31, 32 carry another fulcrum-shaft 33 which is mounted similarly to the shaft 15 and which has keyed to it two arms 34 and 35. The arm 34 terminates in a roller 36 acting as a second follower to the cam 11, while the arm 35 terminates in a die 37 slidably mounted in a radial slot 38 in the cam 13 (whose outline is shown best in Fig. 7C). The follower of the cam 13 is constituted by a roller 39 on a valve tappet 40, which is set at 90° to the tappet 21.

It will be apparent that the tappets 21 and 40 respectively serve to operate the two inlet valves with which the steam engine is provided.

In addition, the fulcrum-shaft 33 is provided with an arm 41 which is formed integral with the arm 34. There is slidably mounted in the free end of the arm 41 a member 42 which is forced to press against the free end of the arm 14 by a spring 43. The function of this spring is to maintain the rollers 17 and 36 in close contact with the cam 11.

The member 42 is made with a part-cylindrical head, having a cleft to accommodate the roller 17 (see Fig. 10), and the arm 14 has a free end shaped at 41a in such a manner that the member 42 makes rolling contact therewith.

The arms 31 and 32, together with the fulcrum-shafts 15 and 33, form a rigid assembly, the rigidity of which is ensured by two transverse stays 44.

As hereinbefore described with reference to Figs. 1 to 5, it is necessary to adjust the setting of the fulcrums of the lever means in order that the period during which the respective admission valves are open can be varied. The necessary adjustment is obtained by appropriately turning in the locomotive cab (not shown) a shaft 45. This shaft has keyed to it a worm 46a meshing with a worm-wheel 46b on a counter-shaft 47, the latter having keyed to it a pinion-wheel 48 meshing with a partly toothed wheel 49 keyed to the sleeve. It will thus be apparent that turning of the shaft 45 results in proportionate angular adjustment of the arms 31, 32, and accordingly of both fulcrum-shafts 15 and 33. Such adjustment will have on the actuation of the admission valves exactly the same effect as hereinbefore described with reference to Figs. 1 to 5.

As aforesaid, the locomotive engine is also provided with two exhaust valves. For the actuation of these, the gear includes an exhaust-valve-actuating cam 50, the followers of which are constituted by a roller 51 on a tappet 52 and a roller 53 on a tappet 54. It will be understood that the tappets 52, 54 serve to operate the respective exhaust valves.

Means are provided whereby the timing of the cam 50 is suitably altered when the fulcrum-shafts 15, 33 are displaced to give reversal of the engine. Said means comprise mainly a sleeve 55 which, on its outer surface, is formed with helical splinings 56 engaged by corresponding splinings in the cam 50. The internal surface of the sleeve 55 is also splined to engage with splinings 57 on the cam-shaft 22. The splinings 56 and 57 would be formed respectively to opposite hands. The sleeve 55 is connected with a member 58 in such a manner that it is locked endwise thereto but is free to rotate relatively thereto. The member 58 has two radial projections 59 which are constrained against turning by abutments 60 forming parts of the gear-case 25. The inner end of each projection 59 enters one of two cam-slots 61 formed in the sleeve 26. The shape of these slots 61 include steeply inclined portions as shown in Fig. 9, which is a developed view of a part of the sleeve 26.

When the arms 31, 32 are rocked about the axis of the cam-shaft to give reversal of the engine, the sleeve 26 with the cam-slots 61 is likewise rocked, with the result that the steeply inclined portions of the slots 61 make the projections 59 move the member 58 endwise along the shaft 22. In consequence of this endwise movement, the sleeve 55 is moved partly through the cam 50 which, by virtue of the splinings, is angularly adjusted with respect to the cam-shaft 22. The longitudinal movement of the sleeve 55 has the effect of setting the exhaust cam to the correct angle relative to the cam-shaft for running in the opposite direction.

The rotary cam need not necessarily be of the double-lift type and mounted on a shaft rotating at half of the crank-shaft speed. If desired, it can be arranged to rotate at the same speed, but in that case, if the timing of the valve opening and closing has to be such as to produce constant admission with adjustable cut-off (or conversely constant cut-off with adjustable admission), the path along which the lever fulcrum can move must not be an arc struck from the cam-shaft centre, if the rotating and oscillating cams are concentric, but some curve such that the angular movement of the follower on the rotary cam relative to the cam-shaft center, due to the displacement of the fulcrum, would have the same equivalent in crank-shaft degrees as the angular movement of the oscillating cam due to the shifting of the fulcrum would have. For example, if the oscillating cam has a swing of 60°, each degree of annular movement of the oscillating cam corresponds approximately to three crankshaft degrees; it is therefore necessary that any angular movement of the follower on the rotary cam relative to the cam-shaft axis shall only produce one third such angular displacement of the oscillating cam. This can be achieved approximately by placing the centre from which the arc of the fulcrum is struck in the appropriate place, which will be found to be on the side of the cam-shaft centre remote from the mean position of the fulcrum.

A suitable arrangement is illustrated in Fig. 11, in which the cam-shaft 80 is rotated at the same speed as the engine crank-shaft. A single-lift cam 81 is keyed to the shaft 80, and a valve-actuating cam 82 is freely journalled thereon. A roller 83 acting as follower to the cam 82 is carried on a valve tappet 84. The lever means comprises a short arm 85 and a long arm 86 both mounted on a fulcrum-shaft 87. In this construction, the arm 86 is attached to the cam 82 by a link 88. The arm 85 has a roller 89 which is kept against the cam 81 by a spring 90 loosely anchored to the shaft 80. The fulcrum-shaft 87 is provided with a die 91 which is slidable from end to end of a curved slot 92 in a fixed quadrant 93. The quadrant 93 is formed with teeth 94 which are engaged by a latch 95 pivoted to a handle 96 on the die 91. By releasing the latch 95, the fulcrum-shaft 87 can be manually adjusted to any selected position between the limiting positions of the die 91 shown in dotted lines.

The curvature of the slot 92 is an arc struck from the centre marked C.

In the operation of the gear shown in Fig. 11, the lever 85, 86 is rocked continuously about the axis of its fulcrum shaft 87 by the rotary cam 81, and the link 88 continuously oscillates the valve-actuating cam 82 in unison with the rocking of the lever.

By adjusting the position of the fulcrum-shaft 87, the valve timing can be varied in accordance with the principles hereinbefore described with reference to Figs. 1 to 5. The differences in construction are due to the fact that the cam-shaft 80 is a full-time shaft, i. e. rotates at crank-shaft speed, and the difference in the centre C of the arc of adjustment of the fulcrum-shaft 87 is due to the fact that the angular movement of the oscillatory cam 82 is less in degrees than the angular movement of the rotary cam 81.

In this arrangement there is a very slight variation in the angle of oscillation of the lever 85, 86 and cam 82 on account of the eccentricity of the centre C.

It must be understood that the invention is not limited to a concentric arrangement of the rotating and oscillating cams, as, though this makes for a convenient design, it is not essential to the successful operation of the valve gear.

I claim:—

1. For actuating a valve of a pressure fluid unit, a valve gear comprising a rotary cam, lever means provided with a normally stationary fulcrum and adapted to be oscillated with substantially constant amplitude by said rotary cam, means for adjusting said fulcrum and an oscillatory valve-actuating cam adapted to be moved with substantially constant amplitude by said lever means through a range of effective movement which can be varied, so as to vary the period of valve actuation, by appropriately adjusting said fulcrum.

2. For actuating a valve of a pressure fluid unit, a valve gear comprising a rotary cam, a valve-actuating cam, a lever provided with a normally stationary fulcrum, and means for adjusting said fulcrum, said lever comprising an arm which is oscillated with substantially constant amplitude by said rotary cam and another arm which is operatively connected with said valve-actuating cam and is adapted to oscillate the same with substantially constant amplitude through a range of effective movement which can be varied, so as to vary the period of valve actuation, by appropriately adjusting said fulcrum.

3. For actuating a valve of a pressure fluid unit, a valve gear comprising a rotary cam, a valve-actuating cam, a lever continuously oscillated with substantially constant amplitude by said rotary cam and operatively connected to said valve-actuating cam so as continuously to oscillate the same with substantially constant amplitude in order to actuate said valve, and means for adjusting the normally stationary fulcrum of said lever so as to vary the range of effective oscillatory movement of said valve-actuating cam.

4. For actuating a valve of a pressure fluid unit, a valve gear comprising a rotary cam, a valve-actuating cam, lever means comprising a normally stationary fulcrum-shaft with arms thereon, one of said arms being oscillated with substantially constant amplitude by the rotary cam and another of said arms being operatively connected to the valve-actuating cam so as to oscillate it with substantially constant amplitude, and means for adjusting said fulcrum-shaft along a curved path.

5. For actuating a fluid-admission valve of a pressure fluid unit, a valve gear comprising a rotary cam-shaft with a cam thereon, a valve-actuating cam mounted for oscillation about the axis of the cam-shaft, a normally stationary fulcrum-carrying assembly mounted for angular adjustment about said axis, means for angularly adjusting said assembly, a fulcrum-shaft forming part of said assembly, and lever arms on said fulcrum-shaft, one of said arms acting as follower to, so as to be oscillated with constant amplitude by, the rotary cam and another of said arms being operatively connected to the valve-actuating cam so as to oscillate the same, the arrangement being such that, by appropriately adjusting the fulcrum-carrying assembly, the period during which the valve is actuated can be varied.

6. For actuating the valves of a pressure fluid unit provided with two fluid admission valves, a valve gear comprising a rotary cam-shaft with a cam thereon, two valve-actuating cams mounted for oscillation about the axis of the cam-shaft, a normally stationary fulcrum-carrying assembly mounted for angular adjustment about said axis, means for angularly adjusting said assembly, two fulcrum-shafts forming parts of said assembly, and lever arms on each of said fulcrum-shafts, one of the arms on each fulcrum-shaft acting as follower to, so as to be oscillated with constant amplitude by, the rotary cam and another of the said arms being operatively connected to one of the valve-actuating cams so as to oscillate the same with constant amplitude, the arrangement being such that, by appropriately adjusting the fulcrum-carrying assembly, the period during which the respective valves are actuated can be varied.

7. For actuating the valves of a pressure fluid unit, a valve gear comprising a rotary cam-shaft, a cam secured thereto so as to rotate therewith, lever means provided with a normally stationary fulcrum and adapted to be oscillated with substantially constant amplitude by said rotary cam, means for adjusting said fulcrum, an oscillatory admission-valve-actuating cam adapted to be moved with substantially constant amplitude by and relatively to said lever means through a range of effective movement which can be varied, so as to vary the period of valve actuation, by appropriately adjusting said fulcrum, and an exhaust-valve-actuating cam adjustably secured to said cam-shaft so as to rotate therewith.

8. For actuating the valves of a pressure fluid unit, a valve gear comprising a rotary cam-shaft, a cam secured thereto so as to rotate therewith, lever means provided with a normally stationary fulcrum and adapted to be oscillated with substantially constant amplitude by said rotary cam, means for adjusting said fulcrum, an oscillatory admission-valve-actuating cam adapted to be moved with substantially constant amplitude by and relatively to said lever means through a range of effective movement which can be varied, so as to vary the period of valve actuation, by appropriately adjusting said fulcrum, an exhaust-valve-actuating cam adjustably secured to said cam-shaft, and means operatively connected to said last mentioned cam and said fulcrum for the adjustment of both thereof in common.

9. For actuating the valves of a pressure fluid unit, a valve gear comprising a rotary cam-shaft, a cam secured thereto so as to rotate therewith, an admission-valve-actuating cam, a lever provided with a normally stationary fulcrum, means for adjusting said fulcrum, said lever comprising an arm which is continuously oscillated with substantially constant amplitude by said rotary cam and another arm which is operatively connected with said valve-actuating cam and is adapted continuously to oscillate the same with substantially constant amplitude through a range of effective movement which can be varied, so as to vary the period of valve actuation, by appropriately adjusting said fulcrum, an exhaust-valve-actuating cam adjustably secured to said cam-shaft, and means operatively connected to said last-mentioned cam and said fulcrum for the adjustment of both thereof in common.

10. For actuating the valves of a pressure fluid unit, a valve gear comprising a rotary cam-shaft, a cam secured thereto so as to rotate therewith, an admission-valve-actuating cam, lever means comprising a normally stationary but adjustable fulcrum-shaft supported by said cam shaft, an arm on said fulcrum-shaft oscillated with substantially constant amplitude by the rotary cam and another arm on said fulcrum shaft connected to the admission-valve-actuating cam so as to oscillate it with substantially constant amplitude, adjustment means for displacing said fulcrum-shaft around the cam-shaft axis, an exhaust-valve-actuating cam adjustably secured to said cam-shaft, and means interconnecting said adjustment means and said last-mentioned cam for the simultaneous adjustment thereof.

11. For actuating the admission and exhaust valves of a pressure fluid unit, a valve gear comprising a rotary cam-shaft, a cam thereon, an admission-valve-actuating cam mounted for oscillation about the axis of the cam-shaft, a normally stationary fulcrum-carrying assembly mounted for angular adjustment about said axis, means for angularly adjusting said assembly, a fulcrum-shaft forming part of said assembly, lever arms on said fulcrum-shaft, one of said arms being oscillated with constant amplitude by the rotary cam and another of said arms being operatively connected to the admission-valve-actuating cam so as to oscillate the same with constant amplitude, an exhaust-valve-actuating cam adjustably secured to said cam-shaft, and adjustment means operatively connected both to said assembly and said last mentioned cam for displacing both simultaneously.

12. For actuating the valves of a pressure fluid unit provided with two fluid admission valves and two exhaust valves, a valve gear comprising a rotary cam-shaft with a cam fixed thereon, two admission-valve-actuating cams mounted for oscillation about the axis of the cam-shaft, a normally stationary fulcrum-carrying assembly mounted for angular adjustment about said axis, means for angularly adjusting said assembly, two fulcrum-shafts forming parts of said assembly, lever arms on each of said fulcrum-shafts, one of the arms of each fulcrum-shaft being oscillated with constant amplitude by the rotary cam and another of said arms being operatively connected to one of the valve-actuating cams so as to oscillate the same with constant amplitude, a single exhaust-valve-actuating cam adjustably secured to said cam-shaft, and adjustment means operatively connected both to said assembly and said last mentioned cam for displacing both simultaneously.

13. For actuating the valves of a pressure fluid unit, a valve gear comprising a half-time rotary cam-shaft, a double-lift cam secured thereto so as to rotate therewith, said cam having approximately constant velocity surfaces, lever means provided with a normally stationary fulcrum and adapted to be continuously oscillated with constant amplitude by said rotary cam, means for adjusting said fulcrum, an oscillatory admission-valve-actuating cam arranged co-axial with said double-lift cam and adapted to be moved continuously with constant amplitude by said lever means through a range of effective movement which can be varied, so as to vary the period of valve actuation, by appropriately adjusting said fulcrum.

14. For actuating the valves of a pressure fluid unit, a valve gear comprising a half-time rotary cam-shaft, a double-lift cam secured thereto so as to rotate therewith, said cam having approximately constant velocity surfaces, an admission-valve-actuating cam, lever means comprising a normally stationary fulcrum-shaft supported by said cam-shaft, arms on said fulcrum-shaft carrying rollers which bear against different parts of said surface whereby said lever means is oscillated with constant amplitude and another arm on said fulcrum-shaft operatively connected to the admission-valve-actuating cam so as to oscillate it with constant amplitude, and adjustment means for displacing said fulcrum-shaft around the cam-shaft axis in order to vary the valve-timing.

15. For actuating the valves of a pressure fluid unit, including admission and exhaust valves, a valve gear comprising a half-time rotary cam-shaft, a double-lift cam secured thereto so as to rotate therewith, said cam having approximately constant velocity surfaces, lever means provided with a normally stationary fulcrum and with rollers bearing against different parts of said cam surfaces whereby said lever means is continuously oscillated with substantially constant amplitude by said rotary cam, means for adjusting said fulcrum, an oscillatory admission-valve-actuating cam adapted to be continuously moved with substantially constant amplitude by and relatively to said lever means through a range of effective movement which can be varied, so as to vary the period of valve actuation, by appropriately adjusting said fulcrum, an exhaust-valve-actuating cam adjustably secured to said cam-shaft and means operatively connected to said last mentioned cam and said fulcrum for the adjustment of both thereof in common.

16. For actuating the valves of a pressure fluid unit provided with two fluid admission valves and two exhaust valves, a valve gear comprising a half-time rotary cam-shaft with a double-lift cam thereon, two admission-valve-actuating cams mounted for oscillation about the axis of the cam-shaft, a normally stationary fulcrum-carrying assembly mounted for angular adjustment about said axis, manually operable gearing for adjusting said assembly, two fulcrum-shafts forming parts of said assembly, lever arms on each of said fulcrum-shafts, said arms carrying a plurality of rollers bearing on said double-lift cam whereby each fulcrum-shaft is oscillated with constant amplitude by the rotary cam, and an additional arm on each fulcrum-shaft operatively connected to one of the valve-actuating cams so as to oscillate the same with constant amplitude, a single exhaust-valve-actuating cam adjustably secured to said cam-shaft, and an operative connection between said exhaust-valve-actuating cam and said gearing, whereby the exhaust-valve-cam timing is varied when the fulcrum-carrying assembly is adjusted.

17. For actuating a valve of a pressure fluid unit, a valve gear comprising a halftime rotary double-lift cam, said cam having approximately constant velocity surfaces, lever means provided with a normally stationary fulcrum and adapted to be oscillated with constant amplitude by said rotary cam, means for adjusting said fulcrum about the axis of rotation of said cam, and an oscillatory valve-actuating cam arranged co-axial with said double-lift cam and adapted to be moved with constant amplitude by said lever means through a range of effective movement which can be varied, so as to vary the period of valve actuation, by appropriately adjusting said fulcrum.

18. For actuating a valve of a pressure fluid unit, a valve gear comprising a halftime rotary double-lift cam, said cam having approximately constant velocity surfaces, a valve-actuating cam co-axial with said double-lift cam and a lever continuously oscillated with constant amplitude by said rotary cam and operatively connected to said valve-actuating cam so as continuously to oscillate the same with constant amplitude in order to actuate said valve, and means for adjusting the normally stationary fulcrum of said lever about the axis of rotation of said cam, so as to vary the range of effective oscillatory movement of said valve-actuating cam.

19. For actuating a valve of a pressure fluid unit, a valve gear comprising a full-time rotary single-lift cam, lever means provided with a normally stationary fulcrum and adapted to be oscillated with approximately constant amplitude by said rotary cam, means for adjusting said fulcrum about an axis eccentric to the axis of rotation of said cam, and an oscillatory valve-actuating cam arranged co-axial with said single-lift cam and adapted to be moved with approximately constant amplitude by said lever means through a range of effective movement with can be varied, so as to vary the period of valve actuation, by appropriately adjusting said fulcrum.

20. For actuating a valve of a pressure fluid unit, a valve gear comprising a full-time rotary single-lift cam, a valve-actuating cam arranged co-axial with said single-lift cam, a lever continuously oscillated with approximately constant amplitude by said rotary cam and operatively connected to said valve-actuating cam so as continuously to oscillate the same with approximately constant amplitude in order to actuate said valve, and means for adjusting the normally stationary fulcrum of said lever about an axis eccentric to the axis of rotation of said cam, so as to vary the range of effective oscillatory movement of said valve-actuating cam.

VERENA WINIFRED HOLMES.